United States Patent
Hansen

(10) Patent No.: US 6,511,036 B1
(45) Date of Patent: Jan. 28, 2003

(54) FRICTION DAMPER FOR VEHICLE ACCESSORIES

(75) Inventor: Scott A. Hansen, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/415,433

(22) Filed: Oct. 8, 1999

(51) Int. Cl.[7] ............................................. F16M 13/00
(52) U.S. Cl. ........................ 248/596; 248/562; 16/438; 296/214
(58) Field of Search ............................. 248/592, 593, 248/596, 608, 609, 635; 16/438, 418, 445, 342; 296/214; 384/220, 152; 188/130, 83

(56) References Cited

U.S. PATENT DOCUMENTS

| | | | | |
|---|---|---|---|---|
| 2,570,117 A | * | 10/1951 | Hallstrand | 384/152 |
| 4,008,298 A | * | 2/1977 | Quantz | 261/44 R |
| 4,331,367 A | * | 5/1982 | Trudeau et al. | 308/26 |
| 4,474,354 A | * | 10/1984 | Field | 248/596 |
| 4,526,118 A | * | 7/1985 | Brauch | 112/315 |
| 4,738,339 A | | 4/1988 | Taylor | 188/322.19 |
| 4,825,983 A | * | 5/1989 | Nakanishi | 188/378 |
| 4,893,522 A | | 1/1990 | Arakawa | 74/574 |
| 5,211,267 A | | 5/1993 | Clark | 188/276 |
| 5,413,317 A | | 5/1995 | Spoerre | 267/134 |
| 5,542,505 A | | 8/1996 | Kempf | 188/77 W |
| 5,542,508 A | | 8/1996 | Van Erden et al. | 188/290 |
| 5,660,252 A | * | 8/1997 | Lafon | 188/130 |
| 5,713,623 A | | 2/1998 | Mattingly | 296/37.7 |
| 5,743,575 A | | 4/1998 | McFarland | 292/336.3 |
| 5,820,205 A | * | 10/1998 | Ammons | 296/214 |
| 5,862,896 A | | 1/1999 | Villbrandt et al. | 188/293 |
| 5,920,957 A | * | 7/1999 | Wagner | 16/112 |
| 5,950,281 A | * | 9/1999 | Lu | 16/342 |
| 6,076,233 A | * | 6/2000 | Sasaki et al. | 16/444 |
| 6,102,169 A | | 8/2000 | Wu | 188/267 |
| 6,312,049 B1 | | 11/2001 | Sullivan et al. | 297/216.1 |
| 6,394,239 B1 | | 5/2002 | Carlson | 188/267.2 |
| 6,397,435 B1 | | 6/2002 | Gosselet | 16/438 |

FOREIGN PATENT DOCUMENTS

| | | |
|---|---|---|
| DE | 3413183 A1 | 10/1985 |
| DE | 4209821 A1 | 10/1992 |
| EP | 0732522 A1 | 9/1996 |
| JP | 62270838 | 11/1987 |
| JP | 10166372 | 6/1998 |

* cited by examiner

Primary Examiner—Leslie A. Braun
Assistant Examiner—Gwendolyn Baxter
(74) Attorney, Agent, or Firm—Foley & Lardner

(57) ABSTRACT

A vehicle accessory and friction damper includes a rotatable member for rotating relative a stationary mount. The rotatable member includes a pivot axle including a circumferential arcuate channel. The stationary mount includes a cylindrical bearing for journaling the pivot axle. An O-ring is seated in the arcuate channel of the pivot axle and interposed between the pivot axle and the cylindrical bearing dampens rotation of the rotatable member relative to the stationary member, whereby the vehicle accessory moves from a first position to a second position in a controlled manner.

10 Claims, 3 Drawing Sheets

FRICTION DAMPER FOR VEHICLE ACCESSORIES

TECHNICAL FIELD OF THE INVENTION

The invention generally relates to a motion damper. More specifically, this invention relates to a motion damper for use with vehicle accessories.

BACKGROUND

Damping devices are used on a variety of vehicle accessories such as console storage bins, glove boxes, slide-out trays and container holders, grab handles, door handles and coat hooks. For example, with console storage bins, which are often integrated into an overhead console, damping devices are typically incorporated into the pivot for a mounted door to provide a smooth, controlled opening action. Similarly, for spring-loaded slides such as those used in container holders or the like, a damping device is often used to control the slide motion as it is extended and retracted. Also, for grab handles, door handles and coat hooks, a damping device is often incorporated into the pivot for the handle or hook, whereby the pivoting motion is controlled and smooth as the handle or hook is extended and retracted.

A conventional damping device is a housing filled with a viscous damping fluid such as silicone, in which a paddle wheel on an axle is mounted with the axle extending from the housing and terminating in an external gear. The housing is typically secured to a structure mounting the movable feature, while a gear on the movable feature engages the gear on the axle of the viscous damping device to slow the movement of the movable feature. Although these damping devices provide the desired control, the devices typically require specific structure that adds to the expense of the vehicle accessory in a highly cost competitive environment.

Another difficulty with viscous damping devices for vehicle accessories is that performance changes with the wide range of temperature fluctuations encountered in the vehicle environment. For a viscous fluid, as the temperature decreases, viscosity increases dramatically. Correspondingly, as the temperature increases, the viscosity decreases. The result is an inconsistent feel to the vehicle accessory. Thus, viscous dampers used in present vehicle accessories provide a compromised performance at a premium price.

SUMMARY OF THE INVENTION

A friction damper for a vehicle accessory according to the invention includes an O-ring on a pivot axle of a rotatable member. The O-ring and pivot axle are received in a bearing of a stationary mount. The O-ring is disposed between the pivot axle and the bearing for damping rotation of the rotatable member relative to the stationary member. In a variation of this embodiment, the pivot axle includes a circumferential arcuate channel for seating the O-ring. Alternatively, two or more O-rings can be used for damping rotation of the rotatable member relative to the stationary member. Further, the amount of damping can be varied by changing the fit between the pivot axle, O-ring and bearing. Also, different materials for the O-ring and bearing alter the amount of damping action.

In a further variation of the invention, the bearing is slidably received in the stationary mount, and includes a tab for reception in a slot in the stationary mount, whereby the bearing is blocked against rotation relative to the stationary mount. Further, the pivot axle may also be slidably received in the rotatable member for rotation therewith.

Also according to the invention, a vehicle accessory includes a rotatable member having a pivot axle, a stationary mount including a bearing for receiving the pivot axle, and a damper including an O-ring disposed between the pivot axle and the bearing for damping rotation of the rotatable member relative to the stationary mount. The rotatable member may, for example, be a grab handle in a vehicle interior. Preferably, the pivot axle includes a circumferential arcuate channel, and the O-ring is seated in the channel. Alternatively, two or more O-rings are disposed between the pivot axle and the bearing for damping rotation of the rotatable member relative to the stationary member.

In a variation of this embodiment, the bearing is slidably received in the stationary mount. Preferably, the bearing includes a tab for reception in a slot of the stationary mount, whereby the bearing is blocked against rotation relative to the stationary mount. Similarly, the pivot axle may also be slidably received in the rotatable member for rotation therewith.

BRIEF DESCRIPTION OF THE DRAWINGS

The various advantages of the present invention will become apparent to those skilled in the art after reading the following specification and by reference to the drawings in which.

DETAILED DESCRIPTION OF THE PREFERRED EMBODIMENTS

Figure 1:
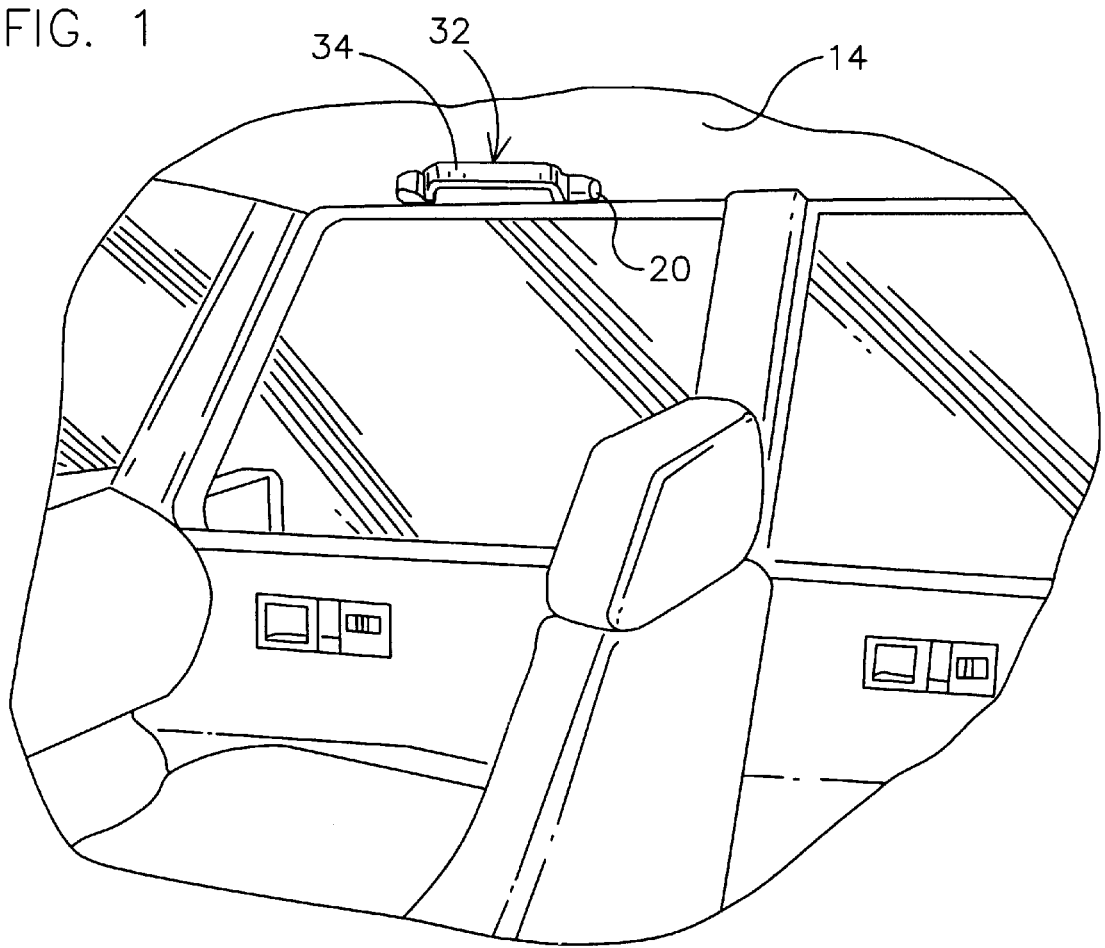
FIG. 1 is a partial perspective view of a vehicle interior including a grab handle having a friction damper according to the invention.
Figure 2:
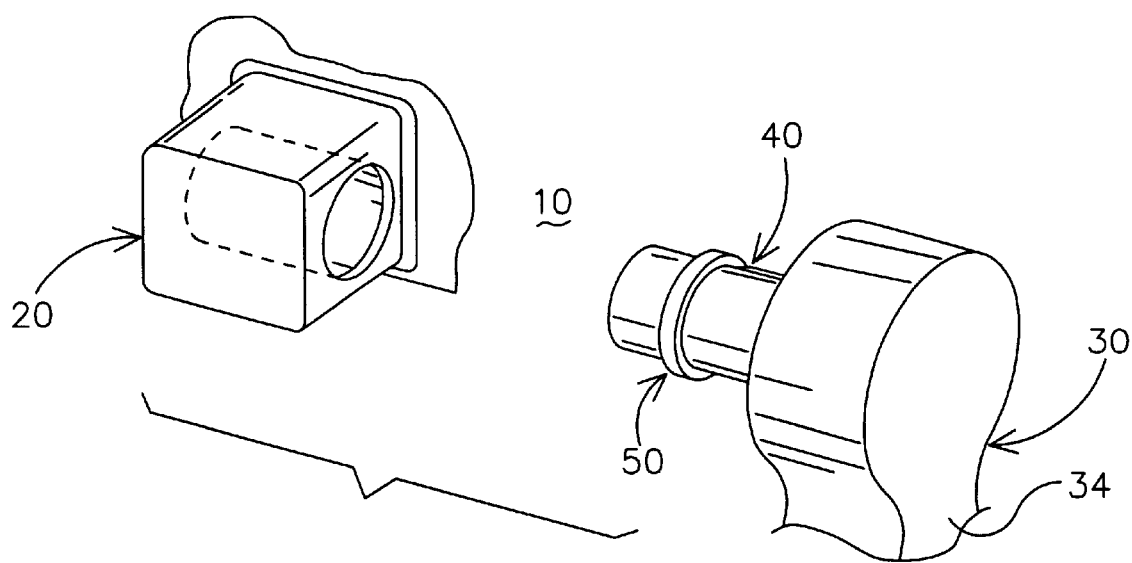
FIG. 2 is a perspective assembly view of the friction damper of FIG. 1.

With reference to the drawings, and in particular to FIGS. 1 and 2, a friction damper 10 according to the preferred embodiment of the present invention is shown. The friction damper 10 is depicted as being part of a vehicle accessory located within the interior of a motor vehicle. In this regard, the friction damper 10 may be connected to a suitable support structure, that is covered by a headliner 14, by means of a stationary mount 20. In addition, the friction damper 10 is also connected to a rotatable member 30 that forms part of the vehicle accessory as will be more fully discussed below. The vehicle accessory disclosed herein is a grab handle 32 which may be used in a conventional motor vehicle. However, the friction damper 10 may also be used in a wide variety of applications such as console storage-bin doors, glove box doors, slidable trays and container holders, interior and exterior handles, visors, coat hooks and other similar movable vehicle accessories. In addition, the headliner 14 may be formed from a suitable composite material covered by an upholstered fabric to conform to the interior of the vehicle.

The grab handle 32 includes a central hand grip portion 34 journaled at opposite ends within a cylindrical bearing of each stationary mount 20. As shown more clearly in FIG. 2, each end of handle portion 34 includes a generally transversely extending pivot axle 40, each including a damper ring 50. The pivot axle 40 and damper ring 50 are received within cylindrical bearing of the stationary mount 20 for rotation therein. The damper ring 50 is at least slightly compressed between cylindrical wall 24 of the bearing and pivot axle 40 to retard the rotation of pivot axle 40 in stationary mount 20.

Figure 3:
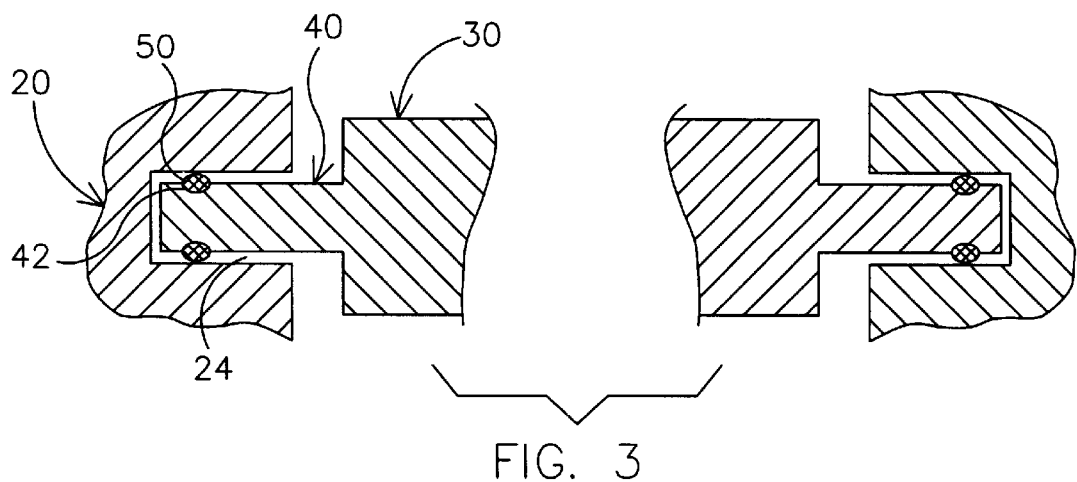
FIG. 3 is a sectional view of the friction damper of FIG. 1.

As shown more clearly in FIG. 3, damper ring 50 is preferably an O-ring seated in an arcuate channel 42 disposed circumferentially on pivot axle 40. The seated damper ring 50 is coaxial with pivot axle 40 and in contact with cylindrical bearing wall 24 of stationary mount 20. The damper ring 50 is disposed between the outer diameter of pivot axle 40 and the cylinder bearing wall 24 to retard rotation of rotatable member 30 relative stationary mount 20. The damper ring 50 is compressed by reducing the distance between pivot axle 40 and cylindrical bearing wall 24, the more retarded the movement of rotatable member 30 relative stationary mount 20.

Figure 4:
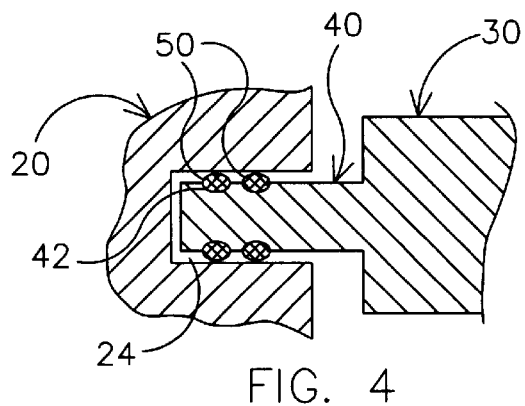
FIG. 4 is a cross-sectional view of an alternative embodiment of the friction damper according to the invention.
Figure 5:
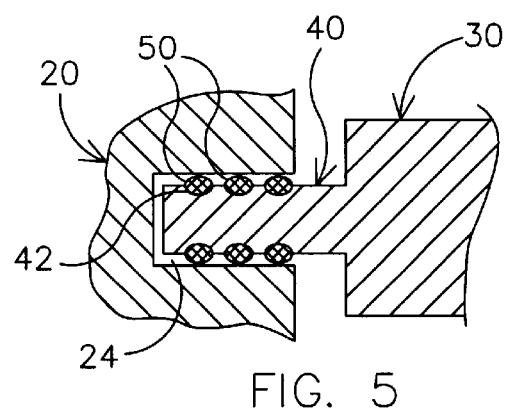
FIG. 5 is a cross-sectional view of a further embodiment of a friction damper according to the invention.

The desired damping action resulting from the frictional interface between damper ring 50 and cylindrical bearing wall 24 can also be varied by including more than one damper ring 50, as is shown in FIGS. 4 and 5. FIG. 4 depicts a pair of damper rings 50, each seated in its own arcuate channel 42 formed circumferentially on the outer surface of pivot axle 40, to increase the surface area of frictional interface within cylindrical bearing wall 24. Similarly, FIG. 5 illustrates three damper rings 50 for further increasing the amount of frictional interface, and thus further retarding the rotation of rotatable member 30 relative stationary mount 20.

The desired damping action from the frictional interface between damper ring 50 and cylindrical bearing wall 24 can also be varied by the properties of the particular materials chosen for cylindrical bearing wall 24 and damper ring 50. Preferably, damper ring 50 is a silicone O-ring and cylindrical bearing wall 24 is made of nylon. Both of these materials are relatively self-lubricating, but can be replaced with drier materials such as a urethane O-ring or a styrene cylindrical bearing wall to variably increase the friction between damper ring 50 and cylindrical bearing wall 24. Other self-lubricating and non-self-lubricating materials can also be used for damper ring 50 and cylindrical bearing wall 24, as will be readily recognized by those of skill in the art. Accordingly, he desired damping action between rotatable member 30 and stationary mount 20 can be achieved by varying the space between the outer diameter of the pivot axle 40 and the inner diameter of the cylindrical bearing, changing the number of damper rings 50 employed, or selecting appropriate materials for both the damper ring 50 and the cylindrical bearing wall 24. Significantly, the arrangement of damper ring 50 variably compressed between the pivot axle 40 of a rotatable member 30 and a cylindrical bearing wall 24 of a stationary mount 20 is relatively unaffected by environmental temperature variations. Rather, the amount of damping is directly related to fit, area of frictional interface, and materials.

Figure 6:
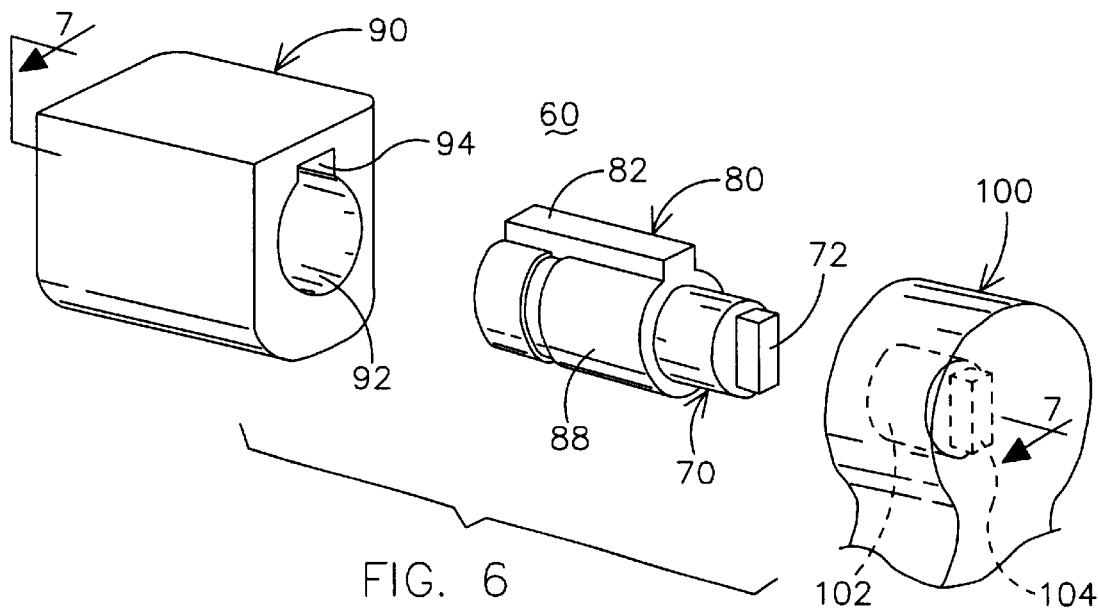
FIG. 6 is an exploded perspective view of yet another friction damper according to the invention.
Figure 7:
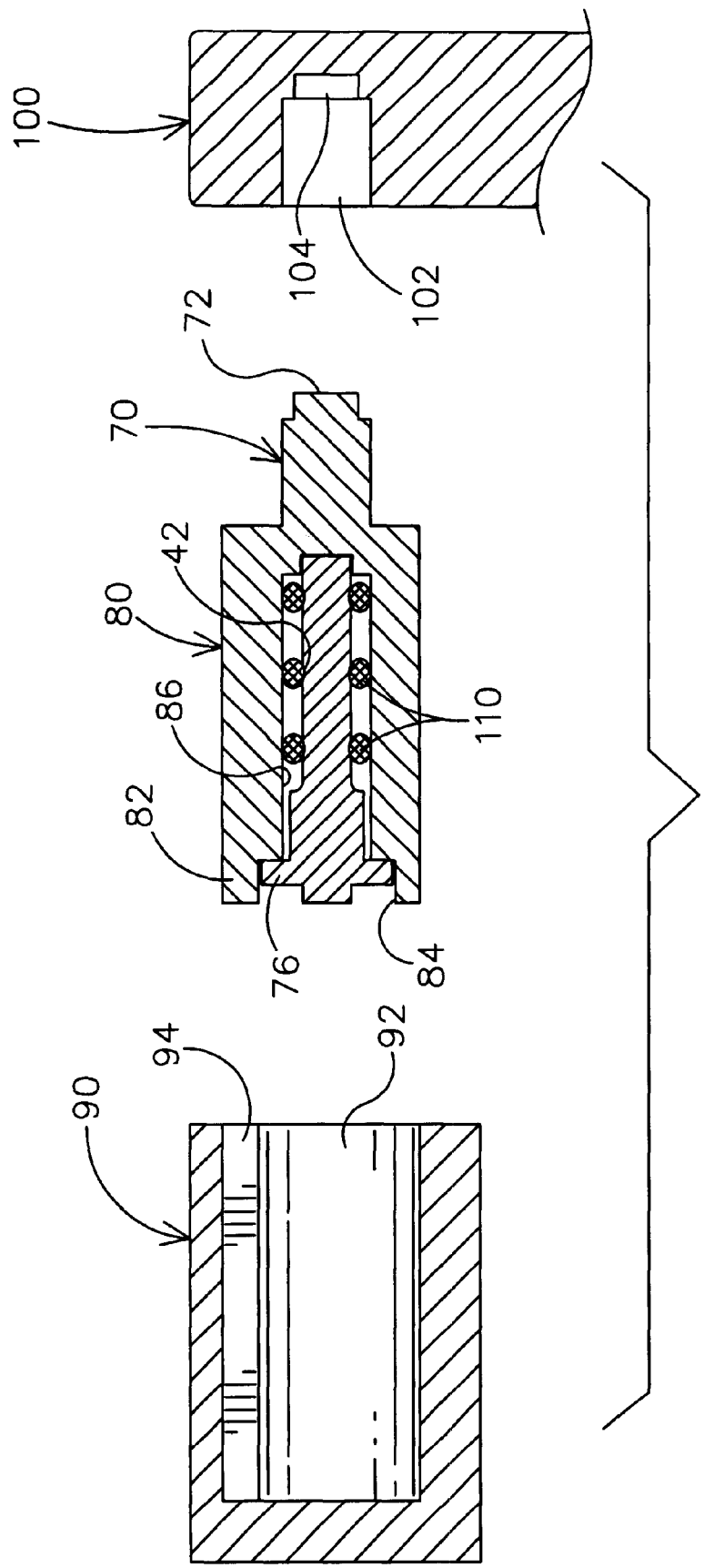
FIG. 7 is a cross-sectional view of the friction damper taken along section line 7—7 of FIG. 6.

An alternative embodiment of a friction damper according to the invention is shown in FIGS. 6 and 7. With reference to FIG. 6, a friction damper 60 includes a pivot axle 70 journaled in a cylindrical bearing 80. Both bearing 80 and pivot axle 70 are keyed for connection to a stationary mount 90 and a rotatable member 100, respectively.

More specifically, cylindrical bearing 80 includes an exterior housing 88 having a generally cylindrical shape and an outwardly extending tab 82. Stationary mount 90 includes a complementary shaped opening 92 including a slot 94 keyed to receive tab 82 of cylindrical bearing 80. Accordingly, after cylindrical bearing 80 is inserted into opening 92 of stationary mount 90, it is prevented from rotation with pivot axle 70 by the reception of tab 82 in slot 94.

The pivot axle 70 also includes a keyed tab 72 for reception in an opening 102 in rotatable member 100. The tab 72 extends generally axially from an end of cylindrical pivot axle 70. Opening 102 includes a keyed slot 104 extending axially inward of opening 102 for reception of tab 72 of pivot axle 70. When opening 102 of rotatable member 100 receives pivot axle 70 and tab 72 is received in slot 104, pivot axle 70 is fixed for rotation with rotatable member 100.

Preferably, both cylindrical bearing 80 and pivot axle 70 are received in openings 92, 102 in stationary mount 90 and rotatable mount 100, respectively, in a friction-fit manner. Alternatively, adhesive can be used to secure the respective parts to one another, or appropriate tolerances in the assembly of rotatable member 100 to stationary mount 90 can hold pivot axle 70 and cylindrical bearing 80 together.

With reference to FIG. 7, the assembly of pivot axle 70, cylindrical bearing 80, stationary mount 90, and rotatable member 100 is more clearly shown. Specifically, pivot axle 70 includes a narrowed axle portion 74 for seating multiple damper rings I 10. While three damper rings 110 are illustrated, more or fewer can be used depending on the desired damping action, as discussed above. Further, pivot axle 70 includes a flanged end 76 seated in a circumferential channel 84 at an end of cylindrical bearing 80. As before, each damper ring 110 is at least slightly compressed between an inner cylindrical bearing wall 86 and circumferential arcuate channels 42 formed in pivot axle 70.

Upon assembly of friction damper 60, pivot axle 70 is journaled for rotation within cylindrical bearing 80. Further, pivot axle 70 is locked for rotation with rotatable member 100 through reception of tab 72 of pivot axle 70 in slot 104 of opening 102. Also, cylindrical bearing 80 is received within opening 92 of stationary mount 90, including the reception of tab 82 of cylindrical bearing 80 in slot 94 of stationary mount 90 to prevent rotation of cylindrical 80 relative stationary mount 90.

In either embodiment of the invention, friction damper 10, 60 dampens rotation of the rotatable member 30, 100 relative to stationary mount 20, 90. The damping is varied by selection of materials for damper rings 50, 110 as well as cylindrical bearing wall 24, 86. Further, the amount of damping is varied by the number of damper rings 50, 110 frictionally interposed between cylindrical bearing wall 24, 86 and pivot axle 40, 70. Also, the space between cylindrical bearing wall 24, 86 and pivot axle 40, 70 filled by damper ring 50, 110 is variable to affect the amount of damping action.

While not shown, it is often preferred to include a spring for biasing the rotatable member 30, 100 in one direction. The invention described herein is simply modifiable to include a spring for biasing rotatable member 30, 100 in such a direction. The spring, of course, should provide a force greater than the damping resistance provided by the materials, fit, and number of damper rings included in the friction damper 10, 60.

While it will be apparent that the preferred embodiments of the invention disclosed are well calculated to fulfill the objects stated, it will be appreciated that the invention is susceptible to modification, variation and change without departing from the spirit thereof

I claim:

1. A friction damper for a vehicle accessory, comprising:

a rotatable member including a pivot axle;

a circumferential arcuate channel in said pivot axle;

a bearing slidably received in a stationary mount, said bearing for receiving said pivot axle;

an o-ring seated in said arcuate channel and disposed between said pivot axle and said bearing for damping rotation of said rotatable member relative said stationary mount;

wherein said bearing includes a tab for reception in a slot of said stationary mount, whereby said bearing is blocked against rotation relative to said stationary mount.

2. The friction damper of claim 1, wherein said o-ring includes a self-lubricating material.

3. The friction damper of claim 1, wherein said circumferential arcuate channel in said pivot axle is a plurality of circumferential arcuate channels and said o-ring disposed between said pivot axle and said bearing is a plurality of o-rings for damping rotation of said rotatable member relative to said stationary mount.

4. The friction damper of claim 1, wherein said pivot axle includes a tab engageable with a slot in said rotatable member, whereby said pivot axle is fixed for rotation with said rotatable member.

5. The friction damper of claim 1, wherein said pivot axle includes a flange engageable with said bearing to limit axial movement of said pivot axle relative to said bearing.

6. A vehicle accessory, comprising:

a rotatable member including a pivot axle;

a circumferential arcuate channel in the pivot axle;

a bearing slidably received in a stationary mount, said bearing for receiving said pivot axle;

a damper including an o-ring disposed between said pivot axle and said bearing for damping rotation of said rotatable member relative to said stationary mount;

wherein said bearing includes a tab for reception in a slot of said stationary mount, whereby said bearing is blocked against rotation relative to said stationary mount.

7. The vehicle accessory of claim 6, wherein said o-ring includes a self-lubricating material.

8. The vehicle accessory of claim 6, wherein said circumferential arcuate channel in said pivot axle is a plurality of circumferential arcuate channels and said o-ring disposed between said pivot axle and said bearing is a plurality of o-rings for damping rotation of said rotatable member relative to said stationary mount.

9. The vehicle accessory of claim 6, wherein said pivot axle includes a tab engageable with a slot in said rotatable member, whereby said pivot axle is fixed for rotation with said rotatable member.

10. The vehicle accessory of claim 6, wherein said pivot axle includes a flange engageable with said bearing to limit axial movement of said pivot axle relative to said bearing.

* * * * *